Nov. 17, 1959 J. E. BRIDGES 2,913,518

SUBSCRIPTION TELEVISION

Filed Jan. 2, 1953 4 Sheets-Sheet 1

JACK E. BRIDGES
*INVENTOR.*

BY Francis W. Crotty

HIS ATTORNEY.

SUBSCRIPTION TELEVISION

Filed Jan. 2, 1953 4 Sheets-Sheet 2

INVENTOR.
JACK E. BRIDGES
BY Francis W. Crotty
HIS ATTORNEY.

INVENTOR:
JACK E. BRIDGES
BY Francis W. Crotty
HIS ATTORNEY.

Nov. 17, 1959 J. E. BRIDGES 2,913,518

SUBSCRIPTION TELEVISION

Filed Jan. 2, 1953 4 Sheets-Sheet 4

JACK E. BRIDGES
*INVENTOR.*

BY Francis W. Crotty

HIS ATTORNEY.

2,913,518

SUBSCRIPTION TELEVISION

Jack E. Bridges, Franklin Park, Ill., assignor to Zenith Radio Corporation, a corporation of Delaware Application January 2, 1953, Serial No. 329,306

13 Claims. (Cl. 178—5.1)

This invention relates to subscription television and more particularly to a novel system for encoding a television signal.

It is a primary object of the present invention to provide a new and improved system for encoding a television signal.

It is a more particular object of the invention to provide an encoding system, for use in the art of subscription television, which provides ample security against unauthorized reception while at the same time requiring only minor modification of the receiver circuits for authorized reception.

It is a corollary object of the invention to provide a novel television transmitter and/or receiver embodying a new and improved encoding system for use in the art of subscription television.

As in all subscription television systems, the present invention contemplates the transmission of a coded composite television signal which requires interpreting information in order to permit intelligible reproduction of the televised image, and that information is supplied only to authorized subscribers in any suitable manner, as for example through the use of a line circuit extending from the transmitter to each authorized receiver or by employing code cards bearing information correlated with the code schedule, and such like. In some known systems, encoding is accomplished by altering the time relation between the video and synchronizing components of the television signal during spaced time intervals, so that the image reproduction at an unauthorized receiver is characterized by a random vertical or lateral displacement or jitter. In other systems, the direction of scanning at the transmitter is reversed during spaced time intervals, so that the image reproduced at unauthorized receivers alternately appears in upright and inverted position. Still other known systems contemplate the introduction of false synchronizing information as a masking signal, a variation of the amplitude relation between video and synchronizing components, or transmission of video and synchronizing components over separate channels. Numerous other encoding systems are also known.

The encoding system of the present invention may perhaps be most readily visualized, in a qualitative sense, by considering the coding operation at the transmitter. The video-signal components and one set of synchronizing-signal components, for example the horizontal or line-synchronizing components, are radiated in a normal manner as amplitude modulation of the video carrier. The vertical or field-synchronizing components, however, are transmitted in camouflaged form as an auxiliary modulation on the audio or sound carrier. Moreover, the vertical or field-scanning rate is altered between two or more discrete modes during spaced time intervals, thus effectively precluding intelligible reproduction at an unauthorized receiver. In the preferred embodiment, the number of scanning lines in each scanning field is varied from one mode to another to provide the desired variation in field-scanning rate. Key signal information indicative of the timing of the mode transitions is supplied to authorized receivers in any suitable manner.

Thus, the television signal radiated from a transmitter constructed in accordance with the present invention resembles a standard composite television signal excepting that it bears no vertical or field-frequency synchronizing components. Horizontal or line-frequency synchronizing components are radiated continuously, even during field-retrace intervals, so that there is no disruption or discontinuity from which vertical or field-frequency synchronizing information may be derived by unauthorized receivers. The true vertical or field-frequency synchronizing information is radiated in the form of an auxiliary modulation of the audio carrier as an indistinguishable part of a complex coding signal which also contains false synchronizing components. The alteration in the vertical or field-scanning rate is preferably effected in accordance with a non-uniform or random code schedule. Consequently, there is no way in which an intelligible image may be reproduced without acquiring the necessary key signal or interpretive information indicative of the code schedule; the image reproduced at an unauthorized receiver, lacking vertical synchronization, rolls vertically at a rapid non-uniform rate. Moreover, by virtue of the variation in the field scanning rate, the image reproduced at an unauthorized receiver is smeared vertically even during those intervals in which rolling of the image may be arrested.

Key signal information representative of the code schedule is distributed in any suitable manner to authorized receivers, and a decoding operation which is the converse of the coding operation employed at the transmitter is controlled by the key signal information to permit reproduction of an intelligible image.

The features of the present invention which are believed to be novel are set forth with particularity in the appended claims. The invention, together with further objects and advantages thereof, may best be understood, however, by reference to the following description taken in connection with the accompanying drawings, in which:

Figure 1:
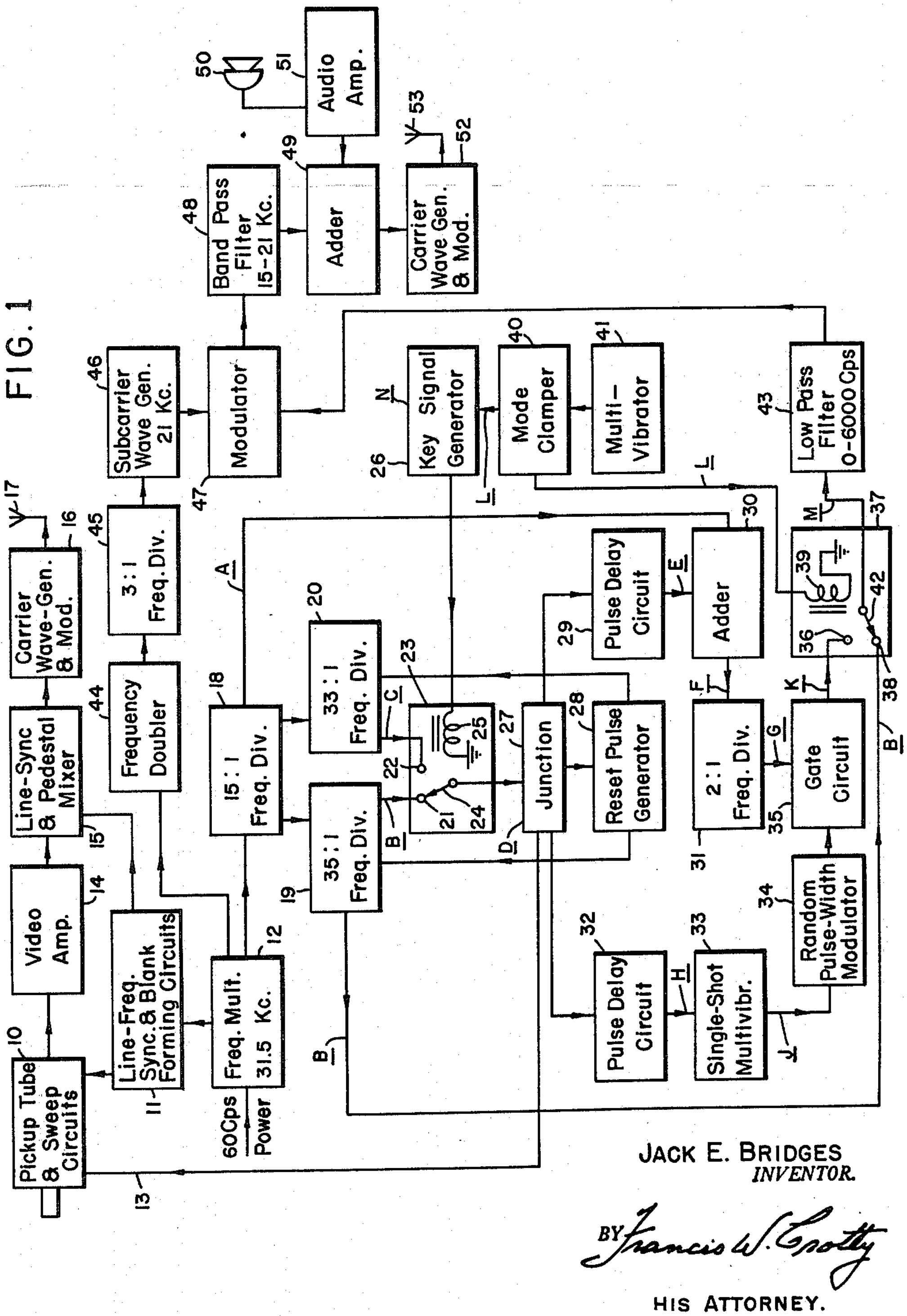
Figure 1 is a schematic block diagram of a subscription television transmitted constructed in accordance with the present invention.

In the transmitter of Figure 1, the optical image to be televised is converted to an electrical signal by means of a camera tube and its associated sweep circuits, designated by a single block 10. Horizontal or line-frequency synchronizing and blanking components, generated by appropriate circuits 11 energized from a frequency multiplier 12 which converts the 60 cycle per second power frequency to an equalizing pulse frequency of 31.5 kilocycles or twice the line-scanning frequency, are employed to control the horizontal or line-frequency scansion of camera tube 10. Vertical or field-frequency scansion of camera tube 10 is controlled by coded field-frequency synchronizing components developed in a manner to be hereinafter described and applied to the appropriate sweep circuits associated with camera tube 10 by means of lead 13. Video signals representative of the image to be televised, generated by camera tube 10, are amplified by means of a video amplifier 14 and combined with horizontal or line-frequency synchronizing and blanking pulses from circuits 11 in an appropriate mixer 15. The resultant combined line-frequency synchronizing and video components from mixer 15 are impressed on a carrier wave generator and modulator 16 which in turn is coupled to a transmitting antenna 17.

Frequency multiplier 12 is also coupled to a frequency divider 18 which may, for example, have a counting rate of 15 to 1. Output pulses from frequency divider 18 are separately impressed on the input circuits of frequency dividers 19 and 20 having different counting rates; specifically, frequency divider 19 may have a counting rate of 35 to 1 and frequency divider 20 a counting rate of 33 to 1. Frequency dividers 19 and 20 are coupled to different input terminals 21 and 22 of a switching device 23, which may, for example, take the form of an electronic switch but is here illustrated for the sake of simplicity as an electromechanical relay having a moving contactor 24 and an energizing coil 25. Operating coil 25 is energized by a key-signal generator 26 the output of which represents a predetermined code schedule, preferably non-uniform or random in nature. The output signal from switching device 23 is applied through a junction 27 to a reset pulse generator 28 which in turn is separately coupled to frequency dividers 19 and 20. Junction 27 is also coupled to lead 13 to supply field-frequency drive pulses to the sweep circuits associated with pickup tube 10.

Field-synchronizing pulses appearing at junction 27 are also impressed on a pulse delay circuit 29 which is constructed to delay the applied input pulses by a predetermined time increment $t_1$ differing from an integral multiple of 7½ line-scanning intervals. The delayed pulses from delay circuit 29 are combined with the output pulses from frequency divider 18 by means of an adder or mixer circuit 30 which is coupled in turn to a frequency divider or counter 31 having a 2 to 1 counting rate. Field-synchronizing pulses from junction 27 are also impressed on another pulse delay circuit 32 which is constructed to delay the applied input pulses by a time increment $t_2$ which is shorter than the delay time $t_1$ of pulse delay circuit 29. Delayed pulses from delay circuit 32 are impressed on a single-shot multivibrator 33 which is coupled through a random pulse width modulator 34 to a normally open gate circuit 35, and frequency divider 31 is also coupled to gate circuit 35. The output from gate circuit 35 is impressed on one terminal 36 of a switching device 37 similar to device 23, and frequency divider 19 is coupled to the other input terminal 38 of switching device 37. The operating coil 39 of switching device 37 is energized from a mode clamper 40 coupled to the output of a multivibrator 41; mode clamper 40 is also coupled to key-signal generator 26 to insure that, during intervals when the moving contactor 42 of switching device 37 is connected to terminal 38, moving contactor 24 of switching device 23 is connected to input terminal 21, as illustrated in the drawing.

Moving contactor 42 of switching device 37 is coupled to a low-pass filter 43 which may be constructed to have a pass band extending up to 6,000 cycles per second. The 31.5-kilocycle signal developed by multiplier 12 is impressed on a frequency doubler 44 followed by a frequency divider 45 having a counting rate of 3 to 1 to provide an energizing signal for a subcarrier wave generator 46. The subcarrier wave from generator 46 and the output of low-pass filter 43 are combined in a modulator 47, and the resulting modulated subcarrier wave is impressed on a band-pass filter 48 having a band width corresponding to that of low-pass filter 43, but translated by an amount determined by the subcarrier wave frequency, to select the significant components of a single sideband of the modulated subcarrier wave. The output of filter 48 is impressed on an adder or mixer 49 where it is combined with the audio portion of the telecast originating at a microphone 50 and amplified by means of an audio amplifier 51. The combined audio intelligence and coded field-frequency synchronizing information is impressed on a carrier wave generator and modulator 52 for radiation from a transmitting antenna 53.

Elements 10—17 and 50—53 of the transmitter of Figure 1 may be of completely conventional construction and may constitute the corresponding components of a conventional existing television transmitter. The remaining elements of the transmitter replace the field-frequency synchronizing-pulse generator and blanking-pulse generator of a conventional television transmitter.

In its broader aspects, the transmitter of Figure 1 develops a series of field-frequency drive pulses of varying repetition rate for application to the sweep circuits associated with pickup tube 10. In the illustrated embodiment, the field-scanning rate is varied between two discrete operating modes in accordance with the code schedule from key signal generator 26, although it is obviously possible to employ a larger number of operating modes or, in a system not employing interlaced scanning, to provide a continuous (e.g. sinusoidal) variation between two limiting scanning rates. In the first mode, termed Mode I for convenience, the field-scanning rate is established at a normal rate of 60 cycles per second, while in the second mode, termed Mode II for convenience, the field scanning rate is altered to 63.6 cycles per second. The true field-frequency drive pulses are transmitted, along with superfluous or false drive pulses, as an auxiliary modulation of the audio carrier. Periodically, at an average frequency much lower than that of the mode changes, unmasked true drive pulses corresponding to Mode I are transmitted to provide an initial phase synchronizing condition at authorized receivers.

Figure 2:
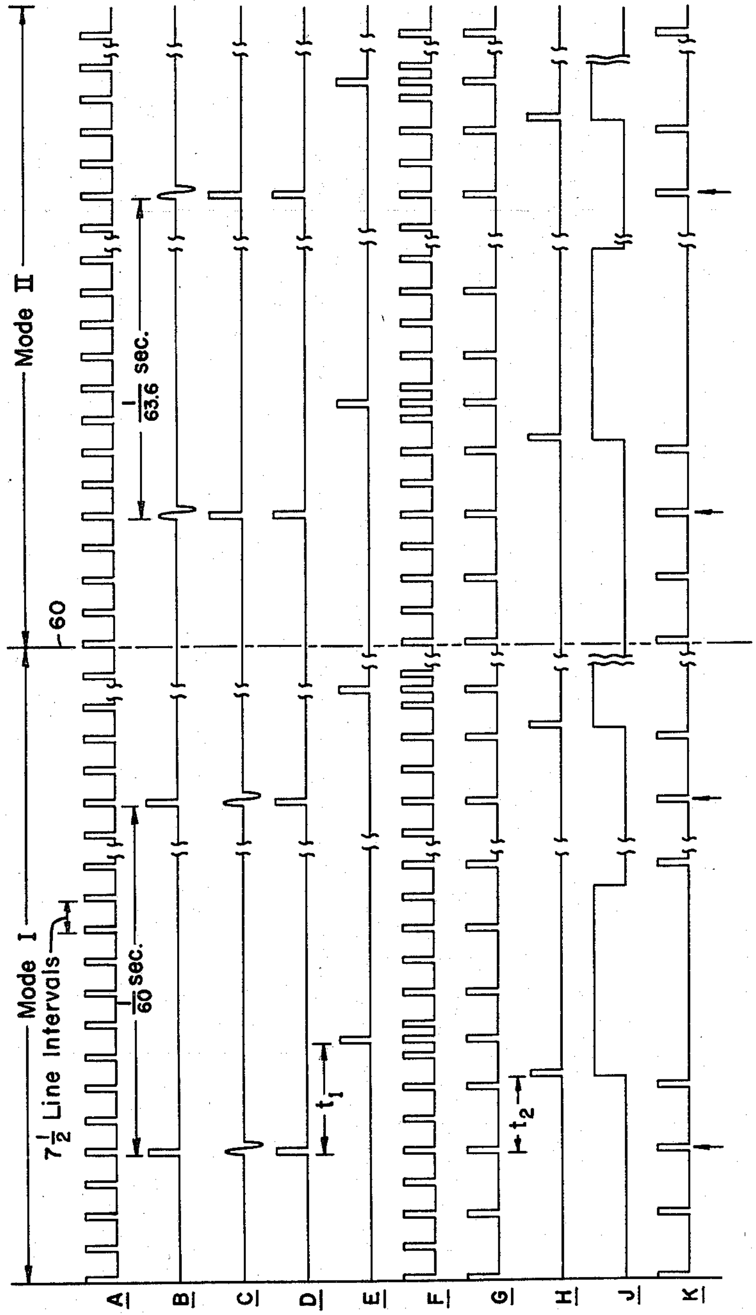
Figures 2, 3 and 4 are graphical representations useful in understanding the operation of the transmitter of Figure 1.
Figure 3:
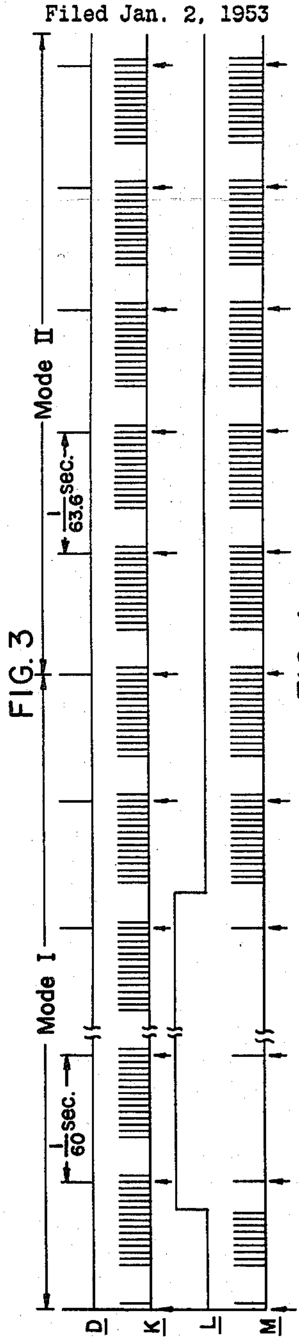
Figure 4:
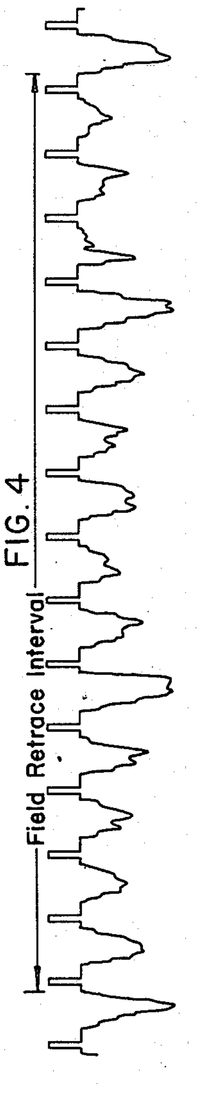
Figure 6:
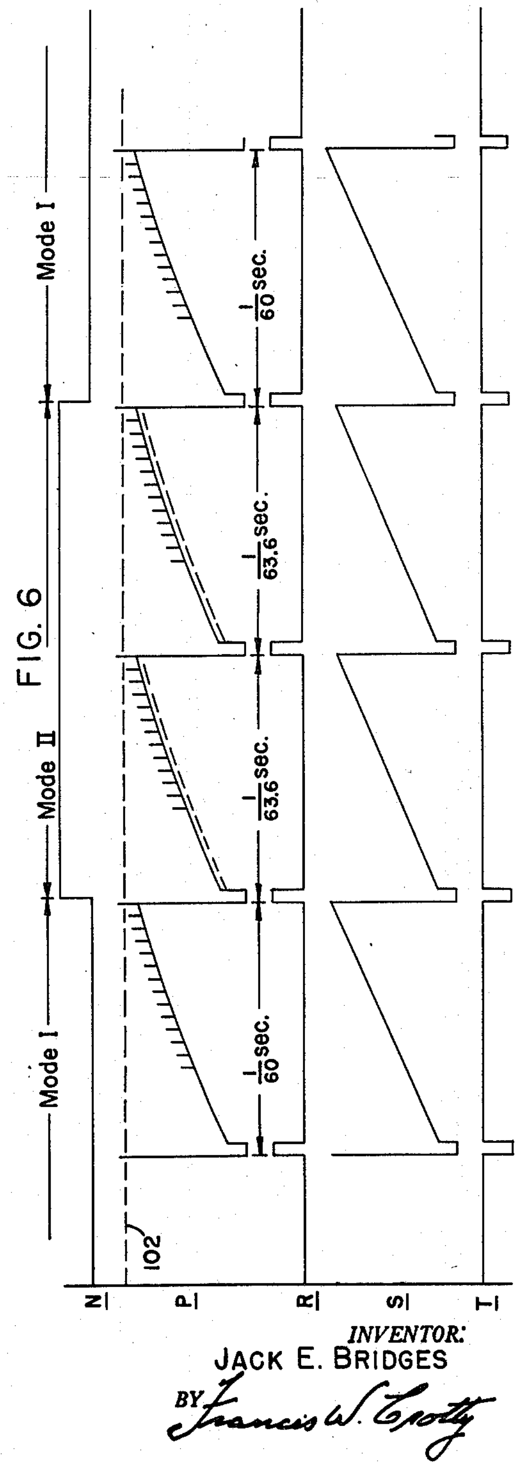
Figure 6 is a graphical representation useful in understanding the operation of the receiver of Figure 5.

In order to facilitate an understanding of the coding system embodied in the transmitter of Figure 1, several idealized waveforms associated with various portions of the transmitter have been illustrated in Figures 2–4, and letters corresponding to those employed to designate these waveforms are applied to the corresponding parts of the transmitter circuit in Figure 1. For a detailed explanation of the encoding operation, reference is now made to the waveforms of Figure 2 in conjunction with the circuit diagram of Figure 1.

31.5-kilocycle equalizing pulses from frequency multiplier 12 are impressed on frequency divider 18 having a counting rate of 15 to 1, and the output from frequency divider 18 thus constitutes a series of pulses, represented by waveform A, recurring at regular intervals corresponding to 7½ line-trace intervals. The pulses A from frequency divider 18 are further stepped down by frequency divider 19 having a counting rate of 35 to 1 to provide Mode I field-frequency drive pulses recurring at the normal field-scanning rate of 60 per second, as represented by the left hand portion of waveform B under the caption "Mode I." Simultaneously, pulses A from frequency divider 18 are also applied to frequency divider 20 having a counting rate of 33 to 1 to provide Mode II field-frequency drive pulses recurring at an accelerated repetition rate of 63.6 per second, as indicated by the right hand portion of waveform C under the caption "Mode II." Mode I and Mode II drive pulses B and C are impressed on alternative input terminals 21 and 22 of switching device 23; consequently, if it is assumed that a mode transition occurs at a time corresponding to the vertical dot-dash line 60 of Figure 2, the output from switching device 23 comprises Mode I and Mode II field-frequency drive pulses in succession as indicated by waveform D. The drive pulses of waveform D constitute the true field-synchronizing pulses and are applied via lead 13 to the appropriate sweep circuits associated with pickup tube 10 to control the vertical or field scansion. Consequently, the two successive fields represented by the waveforms of Figure 2 are of different duration, the second being shorter than the first; in other words, the field-scanning rate is altered from 60 cycles per second in Mode I to 63.6 cycles per second in Mode II. Assuming that the scanning waveform developed by the sweep circuits associated with pickup tube 10 is of constant slope regardless of the mode of operation, and assuming conventional double interlace scanning, each Mode I field comprises 262½ lines and each Mode II field comprises 247½ lines.

The true drive pulses of waveform D are applied through junction 27 to reset pulse generator 28, so that each true drive pulse, regardless of mode, generates a reset transient to reinstitute the count of the instantaneously inactive one of frequency dividers 19 and 20, as indicated in the right hand portion of waveform B and in the left hand portion of waveform C. Consequently, frequency dividers 19 and 20 are always maintained in proper condition to establish the correct count, regardless of when the mode transition may occur.

True field-drive pulses from junction 27 are applied to pulse delay circuit 29, which may consist of an electrical or electromechanical delay line or any other suitable time-delay apparatus. The delay time of pulse delay circuit 29 is greater than the time interval between successive pulses of waveform A and differs from an integral multiple thereof, so that the output pulses E from delay circuit 29 do not appear in time coincidence with any of the pulses of waveform A. Delayed pulses E are combined with the pulses of waveform A from frequency divider 18 in adder or mixer 30, which may be of completely conventional construction, to provide the output signal represented by waveform F for application to frequency divider 31. Divider 31, with a 2 to 1 count down ratio, may comprise a conventional binary counter circuit and selects alternate pulses from adder 30 to provide an output signal represented by waveform G. Except for the pulses immediately adjacent those introduced by delay circuit 29 (waveform E), the pulses of waveform G recur periodically at intervals of 15 line trace intervals; however, by virtue of the introduction of delayed pulses E, successive fields of G pulses, regardless of mode, are displaced by 7½ line trace intervals. The purpose of this displacement is to insure accurate interlacing of successive fields in accordance with standard double interlace transmission practice, in a manner to be described in greater detail hereinafter.

The true field-drive pulses of waveform D are also impressed on a second pulse delay circuit 32 whose delay time $t_2$ is shorter than the delay time $t_1$ of delay circuit 29, to provide delayed output pulses represented by waveform H. The delay time $t_2$ of delay circuit 32 also preferably differs from an integral multiple of the separation between adjacent G pulses. The delayed pulses of waveform H are applied to single-shot multivibrator 33 having a predetermined return time corresponding to several times the interval between adjacent G pulses, as represented by waveform J. The output J from single-shot multivibrator 33 is preferably impressed on a random pulse width modulator 34, which may be a pulse-width modulator of well-known construction controlled by a noise generator and which imparts a random variation to the width of the output pulses represented by waveform J. Random pulse width modulator 34 is included for added security, as hereinafter discussed, but is not essential to the operation of the transmitter; consequently, no waveforms depicting its operation are illustrated in the graphical representations of Figure 2.

The output pulses J from single-shot multivibrator 33, whether width-modulated or not, are applied to gate circuit 35, to the input circuit of which are applied the output pulses G from frequency divider 31. Gate circuit 35 is normally open, permitting the G pulses to pass unaltered except during those intervals when pulses J from multivibrator 33 render the gate nonconductive. Consequently, the output of gate circuit 35, which may be termed the coded field-synchronizing signal, is as represented in waveform K, comprising series of uniformly spaced pulses separated by intervals of quiescence. It is important to note that the coded field-synchronizing signal of waveform K contains all the true synchronizing components, indicated by arrows, as well as a large number of superfluous or false synchronizing pulses which are indistinguishable from the true pulses.

The coded field-synchronizing pulses of waveform K contain all the information necessary to insure vertical or field-frequency synchronization at an authorized receiver, provided the receiver attains a condition of phase synchronism. However, provision must be made to assure lock-in of the receiver with a phase reference in the first instance. In order to provide an initial phase reference, the coded field-synchronizing pulses of waveform K are periodically interrupted and supplanted, for intervals of several field scansions, with true unmasked Mode I field-synchronizing pulses, and the composite coded field-synchronizing pulses are transmitted as an auxiliary modulation of the audio carrier. For a more specific understanding of this portion of the transmitter, reference is made to the waveforms of Figure 3 in conjunction with the circuit diagram of Figure 1.

In Figure 3, waveform D, representing the true field-synchronizing pulses, and waveform K, representing the coded field-synchronizing pulses, are reproduced on a more compressed time scale to facilitate consideration of a larger number of field-scanning intervals. As in Figure 2, the pulses of waveform K corresponding to the true field-synchronizing pulses are indicated by arrows. Multivibrator 41 and mode clamper 40 generate a rectangular voltage wave having a much lower repetition rate than the average frequency of mode transitions, to provide at periodic intervals mode-clamping pulses of a duration corresponding to several field scansions, as for example 6 or 7 field scansions, as represented by waveform L.

The mode-clamping pulses of waveform L perform two important functions. Firstly, the mode-clamping pulses lock key-signal generator 26 to Mode I if it is already operating in Mode I or, in the event key signal generator 26 is instantaneously operating in Mode II, the mode clamping pulses condition generator 26 for Mode I operation. The specific circuitry for performing the mode-clamping function may be dependent on the nature of key-signal generator 26; for example, if the key-signal generator comprises a circuit which is threshold-responsive to the output of a noise-generating tube, mode clamper 40 may merely superimpose the mode-clamping pulses on that circuit as a bias to prevent operation of key-signal generator 26 in Mode II for the duration of the mode-clamping pulses. Thus it is insured that moving contactor 24 of switching device 23 is in the Mode I position, engaging terminal 21, throughout each mode-clamping pulse interval, and the encoding apparatus is clamped to Mode I operation during each such interval.

At the same time, the mode-clamping pulses of waveform L are applied to operating coil 39 of switching device 37 to maintain moving contactor 42 in contact with input terminal 38, thus insuring that only the true Mode I field-synchronizing pulses from frequency divider 19 are translated by switching device 37 during the mode-clamping pulse intervals. The output signal from switching device 37 constitutes a composite coded field-synchronizing signal, represented by waveform M, which consists of the coded field-synchronizing pulses of waveform K interrupted at relatively infrequent intervals by several field scansions of true Mode I field-synchronizing pulses. The unmasked true Mode I field-synchronizing pulses translated during the mode-clamping intervals furnish a phase reference to permit initial lock-in of authorized receivers; since these pulses are always Mode I field-synchronizing pulses, no information is available at unauthorized receivers for determining the field-scanning rate associated with Mode II operation.

To form a subcarrier wave for the composite coded field-synchronizing pulses of waveform M, the 31.5-kilocycle signal from frequency multiplier 12 is passed through frequency doubler 44 and 3-to-1 frequency divider 45, and the resultant 21-kilocycle signal is impressed on subcarrier wave generator 46. The 21-kilocycle subcarrier from generator 46 and the composite coded field-synchronizing pulses of waveform M are impressed on modulator 47, the composite coded field-synchronizing pulses being first passed through a filter 43 which may, for example, have a pass band extending from zero frequency or D.C. to 6,000 cycles per second. The output from modulator 47 is filtered to impress only a single sideband containing the composite coded field-synchronizing pulses on adder or mixer 49 for superposition on the audio intelligence accompanying the transmitted image, and the combined wave from adder 49 is modulated on a radio-frequency carrier for transmission from antenna 53.

Decoding information may be supplied to authorized receivers in any suitable manner. For example, a line circuit extending from the transmitter to each authorized receiver may be provided to translate the key signal originating at generator 26 under the control of a central distributing station such as a telephone exchange. On the other hand, the code schedule represented by the key signal developed by generator 26 may be furnished to authorized subscribers in some other manner. For example, the code schedule may be translated to a punched code card which is furnished to authorized subscribers by an authorized distributing agent, or the code schedule may be represented by a listing of transposition switch positions which may be furnished to authorized subscribers in any desired manner to permit the corresponding decoding apparatus to be properly conditioned for receiving the coded telecast. The manner in which the code schedule information is furnished to authorized receivers is entirely immaterial to the inventive concept of the present application.

With the transmitter of Figure 1, the radiated television signal appearing as a modulation on the video carrier is completely devoid of any field-synchronizing pulses. However, if conventional retrace blanking were employed at the pickup tube without taking further precautions, the radiated signal would comprise black level pedestals timed in synchronism with each field retrace, regardless of the mode of operation, and these pedestals could be detected and employed by unauthorized receivers to provide field-frequency synchronization. Consequently, to enhance the secrecy aspects of the encoding system of the present invention, it is preferred that the electron beam of the transmitter pickup tube be left unblanked during field-retrace intervals, so that a false video signal is developed during such intervals to prevent unauthorized use of the black level pedestals which would otherwise be present. In this connection, it should be pointed out that an image orthicon or other low-velocity scanning device is preferred for use as the pickup tube, to preclude the appearance of extraneous retrace lines in the image reproduced at authorized receivers.

Thus, the television signal radiated as a modulation of the video carrier appears as shown in Figure 4, with the field-retrace interval containing no component which distinguishes it from the remainder of the transmitted signal. In lieu of leaving the electron beam of the pickup tube unblanked during the field retrace, this desired objective may be achieved by dubbing in false video information during field-retrace intervals from a second pickup tube (not shown) provided only for this purpose; by operating the second pickup tube with a fixed phase delay with respect to the first of an amount slightly greater than the duration of the field retrace, it may be insured that the dubbed-in video is of the same general character as the true video immediately preceding the field-retrace interval, thus rendering it practically impossible to detect the field retrace from the modulated video carrier.

Figure 5:
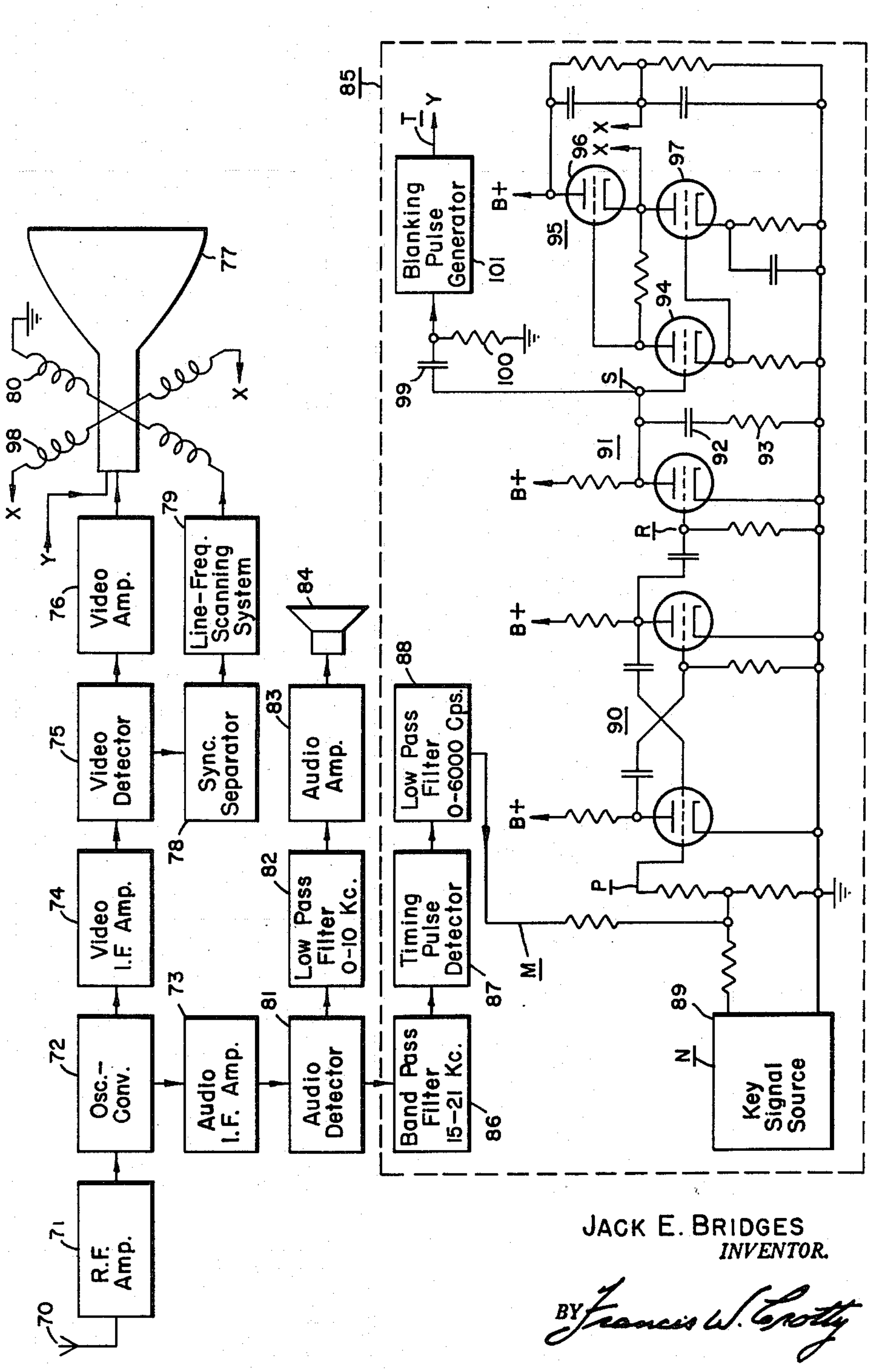
Figure 5 is a schematic diagram of a subscription television receiver constructed in accordance with the invention.

In an authorized receiver, of the type illustrated schematically in Figure 5, the modulated video and audio carriers from the transmitter of Figure 1 are intercepted by an antenna 70 and impressed on a radio-frequency amplifier 71. The amplified radio-frequency signals are impressed on an oscillator-converter 72, and the resulting intermediate-frequency audio and video signals are applied to respective audio and video intermediate-frequency amplifiers 73 and 74. The video intermediate-frequency signals are detected and amplified by stages 75 and 76 and applied to the input circuit of a cathode-ray tube 77 or other image-reproducing device. The detected video signals from stage 75 are supplied to a synchronizing-signal separator 78, which derives the line-frequency synchronizing pulses for application to a line-frequency scanning system 79. Line-frequency scanning system 79 supplies suitable scanning currents to line-frequency deflection coils 80 associated with image-reproducing device 77.

The audio intermediate-frequency signals from amplifier 73 are demodulated by an audio detector 81, and the detected sound signals are passed through a low-pass filter 82, which may have a pass band extending up to 10 kilocycles to include all of the significant sound components while excluding the composite coded field-synchronizing pulses appearing in the frequency range from 15 to 21 kilocycles. The detected sound signals from filter 82 are impressed on an audio amplifier 83 which drives a loudspeaker 84 or other sound-reproducing device.

That portion of the receiver of Figure 5 thus far described may be of completely conventional construction. However, additional apparatus 85 is provided to control the field scansion of image-reproducing device 77 in accordance with the true synchronizing pulses contained in the composite coded field-synchronizing signal received as an auxiliary modulation on the audio carrier.

Demodulated audio signals are impressed on a band-pass filter 86 selective to the frequency band from 15 to 21 kilocycles which contains the coded composite field-synchronizing signal, and the output from filter 86 is impressed on a timing-pulse detector 87, which may comprise a diode detector and an associated load circuit, and a low-pass filter 88 for developing the composite pulse signal represented by waveform M of Figure 3. The composite coded field-synchronizing pulses M thus developed are impressed, together with an appropriate key signal represented by waveform N from a suitable key-signal source 89, on the input circuit of a free-running multivibrator 90 having a natural repetition frequency slightly less than the repetition frequency of the Mode I field-synchronizing pulses. The output from multivibrator 90 is impressed on a conventional discharge tube 91 and associated wave-shaping network comprising a storage condenser 92 and a peaking resistor 93. The scanning signal developed by wave-shaping network 92, 93 is impressed on a phase-splitting tube 94 which drives a field-frequency power output stage 95 comprising a pair of electron-discharge devices 96 and 97 supplied with opposite polarity scanning signals. Output stage 95 is coupled to field-frequency deflection coils 98 associated with image-reproducing device 77, as indicated by the terminal designations X—X. Direct-coupling is employed in all stages from the discharge tube 91 to the field-frequency deflection coils 98.

The scanning signals developed by wave-shaping network 92, 93 are also impressed on a differentiating circuit comprising a series condenser 99 and a shunt resistor 100 in the input circuit of a blanking-pulse generator 101 which in turn is connected to the input circuit of image-reproducing device 77, as indicated by the terminal designations Y, to provide field-retrace block-out.

In operation, the circuit parameters of relaxation oscillator or multivibrator 90 are selected to provide a free-running repetition frequency slightly less than that of the Mode I field-synchronizing pulses in the absence of any applied bias from key-signal source 89. Key-signal source 89 is constructed in such a manner as to impress zero bias on the input circuit of multivibrator 90 during Mode I intervals, and to impress a fixed positive bias on that input circuit during Mode II intervals, as indicated by waveform N. Thus, in the absence of applied triggering pulses, the free-running frequency of multivibrator 90 may be about 58 cycles per second. As indicated in waveform P, the output signal from multivibrator 90 is generally of a peaked sawtooth waveform, with the timing pulses of the composite coded field-synchronizing signal being superimposed on the rising slope. Whenever the input signal to multivibrator 90 exceeds a predetermined tripping level, indicated by the dashed line 102, multivibrator 90 fires and commences a new operating cycle. The circuit parameters are so adjusted that none of the false field-synchronizing pulses preceding the true Mode I field-synchronizing pulse are of sufficient amplitude to fire the multivibrator; however, the true field-synchronizing pulse causes an excursion of the input signal above the tripping level 102, with the result that the multivibrator is synchronized during Mode I intervals with the true Mode I field-synchronizing pulses. The unmasked Mode I pulses recurring at more or less regular intervals provide a phase reference to insure that the multivibrator is only triggered by the desired or true synchronizing pulse.

With the transition from Mode I to Mode II, a positive bias is impressed on the input grid of multivibrator 90, as indicated by waveform N. The effect of this added bias is to decrease the effective tripping level or increase the free-running frequency to a value between the repetition rates of the Mode I and Mode II field-synchronizing pulses. Thus, during Mode II intervals, the multivibrator is fired by an earlier pulse than during Mode I intervals, and vertical or field-frequency synchronism is maintained. With the transition back to Mode I, the bias is removed and the free-running frequency reverts to its initial value, so that synchronism with the true Mode I pulses is maintained.

The output from multivibrator 90 is differentiated to provide trigger pulses R for discharge tube 91, which cooperates with wave-shaping network 92, 93 in a conventional manner to provide a field-scanning voltage of peaked sawtooth waveform as indicated by waveform S. Direct-coupling is employed from the discharge tube to the field-frequency deflection coil to clamp the pulse peaks of the scanning voltage to a constant reference level, thus insuring that field trace commences at a predetermined fixed point on the screen of image-reproducing device 77 regardless of the instantaneous mode of operation. Scanning voltage S is differentiated by the input circuit of blanking-pulse generator 101 to provide field-frequency blanking pulses T for application to the input circuit of image-reproducing device 77; blanking-pulse generator 101 may comprise a phase inverter to provide positive-polarity blanking pulses for application to the cathode of cathode-ray tube 77, or a cathode follower for providing negative-polarity blanking pulses to the control grid of cathode-ray tube 77, depending on which electrode is employed for application of the video signals.

Thus, at an authorized receiver in which key-signal source 89 is provided and controlled in accordance with the code schedule employed at the transmitter, through the use of line circuits, code cards, preset transposition switches, or the like, the transmitted image is intelligibly reproduced on the viewing screen of image-reproducing device 77. Accurate interlace is insured by a transmitter operation not requiring any corresponding receiver function, as explained in connection with waveforms F, G, H, J and K of Figure 2. Moreover, the random width modulation of the gating pulses J employed at the transmitter does not entail the necessity of performing any inverse operation at the receiver, the purpose of such modulation being only to vary the false-pulse count of the composite coded field-synchronizing signal to preclude derivation of the code schedule from the radiated signal by any unauthorized agency.

The present invention has been disclosed and described with reference to presently existing U.S. governmental standards in order to facilitate an understanding of the inventive concept. However, it is apparent that the encoding system of the present invention is not dependent upon any particular set of transmitting standards and may be applied with comparable advantage in connection with the transmission of subscription television signals in foreign countries or under other circumstances where the presently adopted United States standards do not prevail. Moreover, for the sake of simplicity, the construction and operation of the system have been predicated on the use of two different scanning modes, although it is apparent that three or more may be employed if desired. Still further, it is not essential that any one of the operating modes correspond to the established standard scanning rate. In systems not employing interlaced scanning, it is also possible to arrange the encoding system to vary the scanning rate in accordance with a continuous coding wave, as for example a sine-wave coding signal of constant or varying periodicity, rather than employing variations between two or more discrete operating modes. Still further, the horizontal or line-frequency scanning rate may be varied in addition to or in lieu of the variation in the field-scanning rate, although variation of the line-scanning rate imposes severe requirements on the transmitter and receiver circuitry.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. In the art of subscription television, encoding apparatus comprising: an electro-optical image-transducing device; a first pulse generator for developing pulses of a first predetermined repetition rate; a second pulse generator for developing pulses recurring at a second predetermined repetition rate different from said first repetition rate; means for alternately sampling said pulses from said pulse generators in accordance with a predetermined code schedule to develop a composite timing pulse signal; means responsive to said composite timing pulse signal for varying the scanning frequency of said image-transducing device in one coordinate direction between said first and second repetition rates in accordance with said code schedule; and means for controlling the scansion of said image-transducing device in another coordinate direction.

2. A subscription television transmitter comprising: an image-converting device; a first pulse generator for developing pulses of a first predetermined repetition rate; a second pulse generator for developing pulses recurring at a second predetermined repetition rate different from said first repetition rate; means for alternately sampling said pulses from said pulse generators in accordance with a predetermined code schedule to develop a composite timing pulse signal; means responsive to said composite timing pulse signal for varying the scanning frequency of said image-converting device in one coordinate direction between said first and second repetition rates in accordance with said code schedule; means for controlling the scansion of said image-converting device in another coordinate direction, whereby a video signal is generated by said image-converting device; means for coding said composite timing pulse signal; and means for transmitting said video signal and said coded timing pulse signal.

3. A subscription television transmitter comprising: an image-converting device; a first pulse generator for developing pulses of a first predetermined repetition rate; a second pulse generator for developing pulses recurring at a second predetermined repetition rate different from said first repetition rate; means for alternately sampling said pulses from said pulse generators in accordance with a predetermined code schedule to develop a composite timing pulse signal; means responsive to said composite timing pulse signal for varying the scanning frequency of said image-converting device in one coordinate direction between said first and second repetition rates in accordance with said code schedule; means for controlling the scansion of said image-converting device in another coordinate direction, whereby a video signal is generated by said image-converting device; means for coding said composite timing pulse signal; and separate means for concurrently transmitting said video signal and said coded timing pulse signal over different communication channels.

4. A subscription television transmitter comprising: an image-converting device; a first pulse generator for developing pulses of a first predetermined repetition rate; a second pulse generator for developing pulses recurring at a second predetermined repetition rate different from said first repetition rate; means for alternately sampling said pulses from said pulse generators in accordance with a predetermined code schedule to develop a composite timing pulse signal; means responsive to said composite timing pulse signal for varying the scanning frequency of said image-converting device in one coordinate direction between said first and second repetition rates in accordance with said code schedule; means for controlling the scansion of said image-converting device in another coordinate direction, whereby a video signal is generated by said image-converting device; means for coding said composite timing pulse signal comprising means for superimposing false synchronizing pulses on said composite timing pulse signal; and means for transmitting said video signal and said coded timing pulse signal.

5. A subscription television transmitter comprising: an image-converting device; a first pulse generator for developing pulses of a first predetermined repetition rate; a second pulse generator for developing pulses recurring at a second predetermined repetition rate different from said first repetition rate; means for alternately sampling said pulses from said pulse generators in accordance with a predetermined code schedule to develop a composite timing pulse signal; means responsive to said composite timing pulse signal for varying the scanning frequency of said image-converting device in one coordinate direction between said first and second repetition rates in accordance with said code schedule; means for controlling the scansion of said image-converting device in another coordinate direction, whereby a video signal is generated by said image-converting device; means for coding said composite timing pulse signal comprising means for developing false synchronizing pulses, means for combining said false synchronizing pulses with said composite timing pulse signal, and means for coding said false synchronizing pulses; and means for transmitting said video signal and said coded timing pulse signal.

6. A subscription television transmitter comprising: an image-converting device; a first pulse generator for developing pulses of a first predetermined repetition rate; a second pulse generator for developing pulses recurring at a second predetermined repetition rate different from said first repetition rate; means for alternately sampling said pulses from said pulse generators in accordance with a predetermined code schedule to develop a composite timing pulse signal; means responsive to said composite timing pulse signal for varying the scanning frequency of said image-converting device in one coordinate direction between said first and second repetition rates in accordance with said code schedule; means for controlling the scansion of said image-converting device in another coordinate direction, whereby a video signal is generated by said image-converting device; means for coding said composite timing pulse signal comprising means for developing false synchronizing pulses, means for combining a group of said false synchronizing pulses with each pulse of said composite timing pulse signal, and means for varying the number of said false synchronizing pulses constituting said groups; and means for transmitting said video signal and said coded timing pulse signal.

7. A subscription television transmitter comprising: an image-converting device; a first pulse generator for developing pulses of a first predetermined repetition rate; a second pulse generator for developing pulses recurring at a second predetermined repetition rate different from said first repetition rate; means for alternately sampling said pulses from said pulse generators in accordance with a predetermined code schedule to develop a composite timing pulse signal; means responsive to said composite timing pulse signal for varying the scanning frequency of said image-converting device in one coordinate direction between said first and second repetition rates in accordance with said code schedule; means for controlling the scansion of said image-converting device in another coordinate direction, whereby a video signal is generated by said image-converting device; means for coding said composite timing pulse signal; means for generating two separate radio-frequency carrier waves; means for modulating one of said carrier waves with said video signals; means for modulating the other of said carrier waves with said coded composite timing signal; and means for transmitting said modulated carrier waves.

8. A subscription television transmitter comprising: an image-converting device; a first pulse generator for developing pulses of a first predetermined repetition rate; a second pulse generator for developing pulses recurring at a second predetermined repetition rate different from said first repetition rate; means for alternately sampling said pulses from said pulse generators in accordance with a predetermined code schedule to develop a composite timing pulse signal; means responsive to said composite timing pulse signal for varying the scanning frequency of said image-converting device in one coordinate direction between said first and second repetition rates in accordance with said code schedule; means for controlling the scansion of said image-converting device in another coordinate direction, whereby a video signal is generated by said image-converting device; means for coding said composite timing pulse signal comprising means for developing false synchronizing pulses, means for combining said false synchronizing pulses with said composite timing pulse signal, and means for coding said false synchronizing pulses; means for intermittently disabling said combining means to provide recurrent intervals of uncoded transmission to serve as a phase reference for authorized receivers; and means for transmitting said video signal and said coded timing pulse signal.

9. A subscription television transmitter comprising: an image-converting device and an associated scanning system; means coupled to said scanning system for varying the scanning frequency of said device in at least one direction from time to time in accordance with a predetermined code schedule and for generating composite television signals including image-signal and synchronizing-signal components; means for generating false synchronizing signals; means for combining said false synchronizing signals with said synchronizing-signal components to code said composite television signals; and means for intermittently disabling said combining means to provide recurrent intervals of uncoded transmission to serve as a phase reference for authorized receivers.

10. A subscription television transmitter comprising: an image-converting device; a source of scansion-synchronizing signals; means coupled to said scansion-synchronizing signal source for varying the scanning frequency of said image-converting device in at least one direction from time to time in accordance with a predetermined code schedule and for developing composite television signals; a source of false synchronizing signals; means for combining said false synchronizing signals with said scansion-synchronizing signals to code said composite television signal; means for coding said false synchronizing signals; and means for separately transmitting said image signals and said scansion-synchronizing signals as coded with said coded false synchronizing signals.

11. Subscription television apparatus comprising: an electro-optical image-transducing device and associated line-scanning and field-scanning elements responsive to applied scanning signals for effecting line and field scansion in coordinate directions; a line-frequency scanning system coupled to said line-scanning element; a field-frequency scanning system coupled to said field-scanning element; means for periodically energizing one of said scanning systems to effect scansion of said device in one coordinate direction at a predetermined repetition rate; and means for energizing the other of said scanning systems at a predetermined repetition rate during spaced time intervals and at a different repetition rate during other spaced time intervals to effect scansion of said device in the other coordinate direction at different repetition rates in two operating modes and encode said television signal.

12. Subscription television apparatus comprising: an electro-optical image-transducing device and associated line-scanning and field-scanning elements responsive to applied scanning signals for effecting line and field scansion in coordinate directions; a line-frequency scanning system coupled to said line-scanning element; means for periodically energizing said line-frequency scanning system to effect line scansion of said device at a predetermined repetition rate; a field-frequency scanning system coupled to said field-scanning element; and means for energizing said field-frequency scanning system at a predetermined repetition rate during spaced time intervals and at a different repetition rate during other spaced time intervals to effect field scansion of said device at different repetition rates in two operating modes, thereby to vary the number of scanning lines constituting a scanning field in one mode with respect to that in the other and encode said television signal.

13. Subscription television apparatus comprising: an electro-optical image-transducing device comprising means for projecting an image-tracing beam; scanning means associated with said image-transducing device and including a deflection-control element responsive to an applied scanning signal for imparting a scanning motion to said beam; a scanning-signal generator for developing a cyclical scanning signal and having one operating mode characterized by a series of several successive trace intervals of one duration and another operating mode characterized by another series of several successive trace intervals of a different duration; a source of key signals having a characteristic which varies between two different operating conditions in accordance with a code schedule; and means coupled to said key-signal source and to said scanning-signal generator and responsive to said key signals for triggering said scanning-signal generator from one of said operating modes to the other in accordance with said code schedule.

References Cited in the file of this patent

UNITED STATES PATENTS

| | | |
|---|---|---|
| 2,510,046 | Ellett | May 30, 1950 |
| 2,566,764 | Fyler et al. | Sept. 4, 1951 |
| 2,567,545 | Brown | Sept. 11, 1951 |
| 2,656,406 | Gray et al. | Oct. 20, 1953 |
| 2,656,409 | Morris et al. | Oct. 20, 1953 |
| 2,678,347 | Clothier | May 11, 1954 |
| 2,770,803 | Ellett | Nov. 13, 1956 |
| 2,809,231 | Roschke | Oct. 8, 1957 |